(12) United States Patent
Gershman et al.

(10) Patent No.: US 8,369,045 B1
(45) Date of Patent: Feb. 5, 2013

(54) SECURE DATA STORAGE

(75) Inventors: Vladimir Gershman, Holland, PA (US);
Ronald Dean, Marlton, NJ (US);
Bernard McGarth, Morrisville, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/537,465

(22) Filed: Jun. 29, 2012

Related U.S. Application Data

(62) Division of application No. 12/717,999, filed on Mar. 5, 2010, now Pat. No. 8,213,115, which is a division of application No. 11/504,376, filed on Aug. 14, 2006, now Pat. No. 7,706,102.

(51) Int. Cl.
*G11B 7/0037* (2006.01)
*G11B 7/0055* (2006.01)
(52) U.S. Cl. ....... 360/118; 360/59; 360/66; 360/125.31; 360/125.74
(58) Field of Classification Search .................... 360/59, 360/66, 118, 125.31, 125.74, 137
See application file for complete search history.

(56) References Cited

U.S. PATENT DOCUMENTS

| | | | | |
|---|---|---|---|---|
| 5,056,081 A | * | 10/1991 | Hsieh | 369/100 |
| 5,206,843 A | * | 4/1993 | Kaburagi | 369/13.04 |
| 5,231,614 A | * | 7/1993 | Shindo et al. | 369/13.04 |
| 5,956,311 A | * | 9/1999 | Kawai | 369/100 |
| 7,050,256 B1 | * | 5/2006 | Oakley | 360/66 |
| 2002/0002685 A1 | * | 1/2002 | Shim | 713/200 |
| 2005/0286398 A1 | * | 12/2005 | Higuchi et al. | 369/272.1 |

FOREIGN PATENT DOCUMENTS

| | | | | |
|---|---|---|---|---|
| CN | 101425319 A | * | 5/2009 | |
| DE | 3708540 A | * | 9/1988 | |
| JP | 2000222741 A | * | 8/2000 | |
| JP | 2003217129 A | * | 7/2003 | |
| JP | 2004046938 A | * | 2/2004 | |

\* cited by examiner

*Primary Examiner* — Will J Klimowicz
(74) *Attorney, Agent, or Firm* — Howard IP Law Group, PC

(57) ABSTRACT

A hard disk drive includes a chassis which supports a "sealed" housing containing a data storage magnetic disk, and read/write heads and actuator. The housing also contains an erasure device which generates a magnetic or other field or emanation for erasing the disk, so that the erasing field or emanation need not penetrate the sealed housing to effectuate erasure. A backup power supply provides power to the erasing device so that erasure can occur even in the absence of external power. A bus- or network-actuated arrangement couples power to the erasure device so that many hard drives may be simultaneously erased.

16 Claims, 5 Drawing Sheets

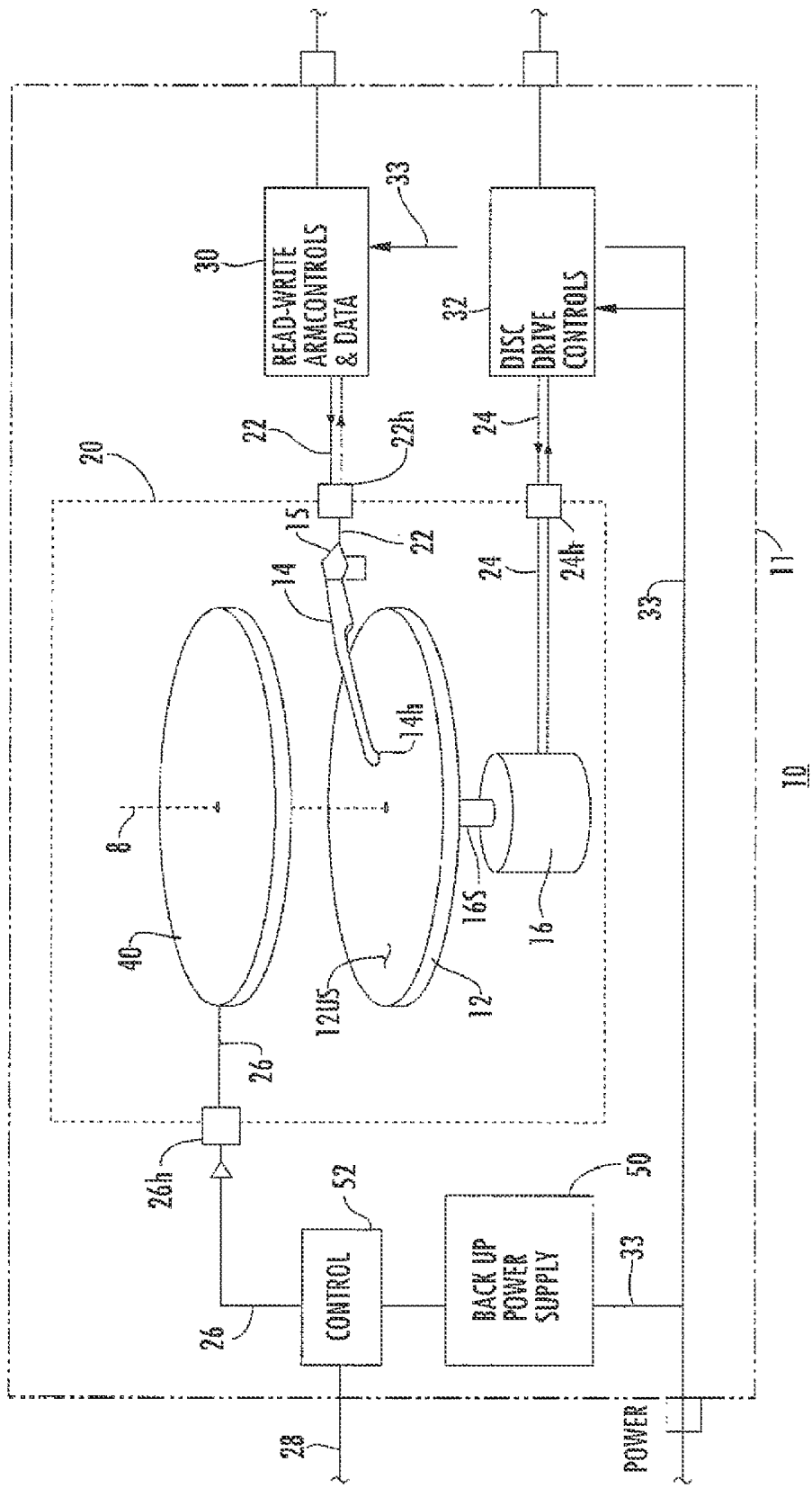

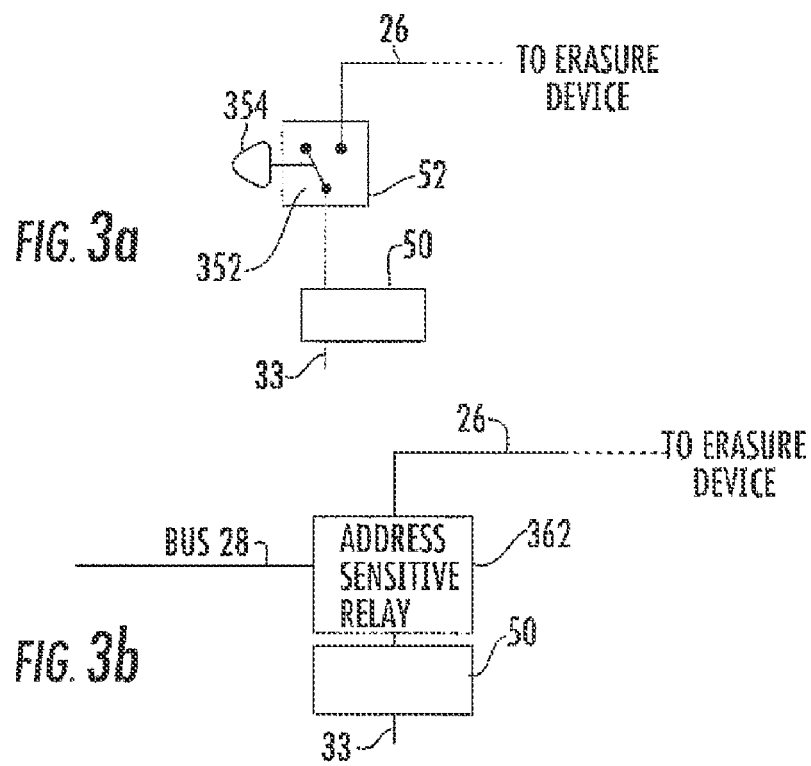
FIG. 3a
FIG. 3b
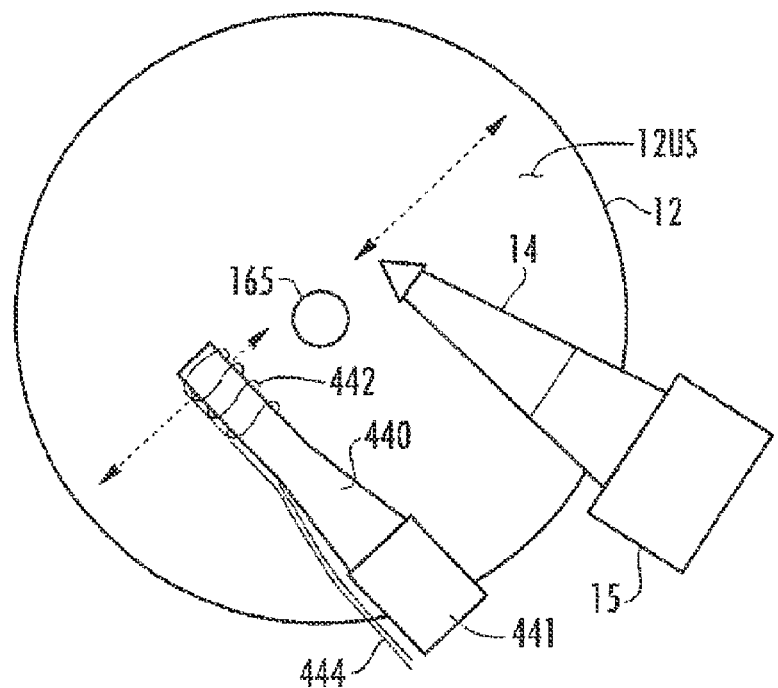
FIG. 4

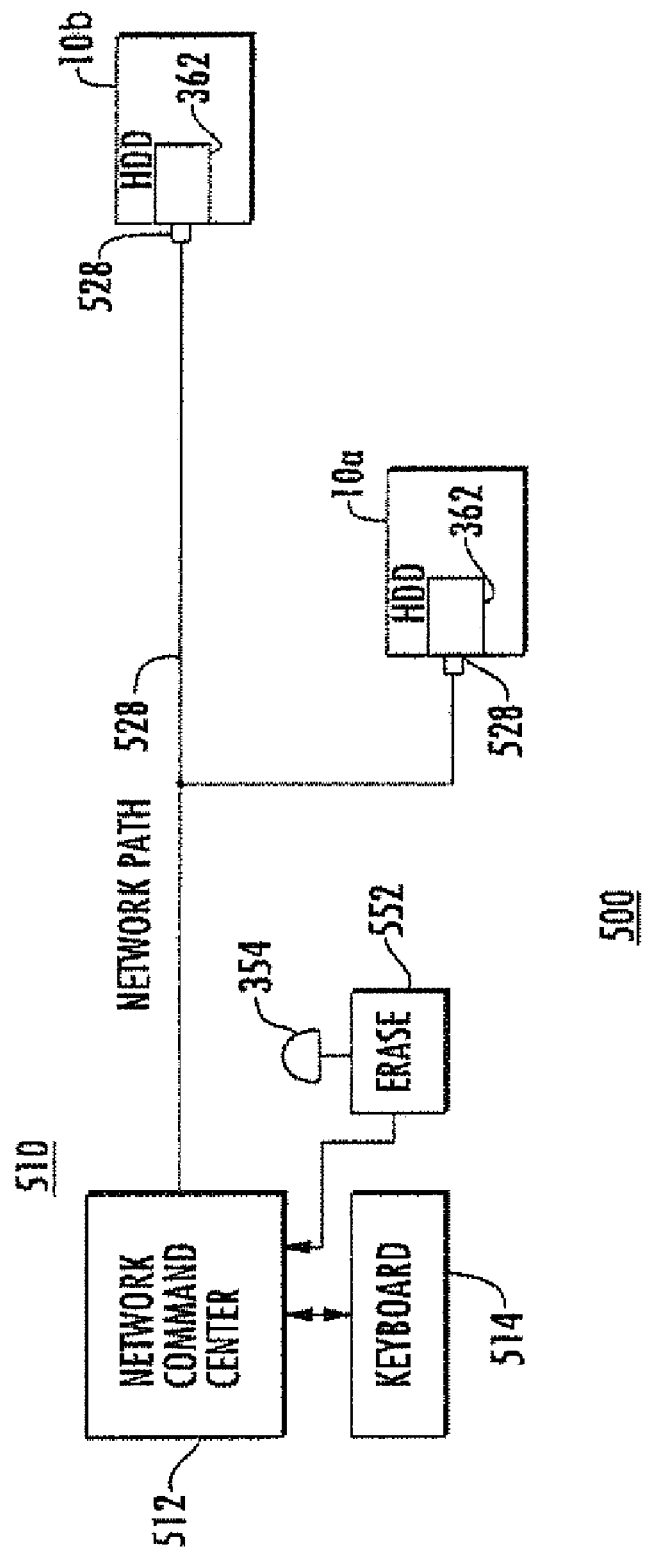

SECURE DATA STORAGE

CROSS-REFERENCE TO RELATED APPLICATION

This application is a divisional of co-pending U.S. patent application Ser. No. 12/717,999, filed Mar. 5, 2010, now U.S. Pat. No. 8,213,115 by Vladimir Gershman et al., titled "Secure Data Storage", which is a divisional of U.S. patent application Ser. No. 11/504,376, filed Aug. 14, 2006, now U.S. Pat. No. 7,706,102 by Vladimir Gershman et al., titled "Secure Data Storage", issued Apr. 27, 2010, the entirety of which applications are incorporated herein by reference.

FIELD OF THE INVENTION

This invention relates to the storage of data on magnetic disks, and more particularly to structures which allow quick erasure of the data stored on data storage magnetic disks by means of magnetic degaussing located within the housing of the data storage magnetic disk.

BACKGROUND OF THE INVENTION

Government labs, ships and aircraft carry data or information which is intended to be kept secret. Very often, this information is stored on magnetic hard disk drives (HDD) in computer-controlled equipment. Standard operating procedures in such environments often specify that the computer equipment or the hard disk drive be destroyed, or at least that the hard drive be erased, in the event that custody of the equipment, ship or aircraft may be lost. Such loss might be due to hostile action, or to mechanical failure or adverse environmental conditions.

One way that the information or data on a hard disk can nominally be erased is to use the "delete" function available in many operating systems. This function operates almost instantaneously. Unfortunately, the delete function does not actually delete the data involved, but instead it merely makes the region in which the data is stored on the magnetic data storage disk or platter available to be overwritten by new data. Simple techniques can undelete the information, so long as it has not been overwritten, and make it available. Thus, the delete function does not provide satisfactory security. It has been suggested that emptying the "recycle" bin following deletion of files will permanently remove the files so treated, but the data still remains on the magnetic data storage disk.

Another software solution is to perform a low-level format to thereby nominally erase the data on the hard disk. The low-level format essentially scans the disk with a head producing a magnetic field sufficient to reset the state of each bit of the disk. In this regard, the hard disk may be likened to a palimpsest, in that the recording medium may be reused after the erasure. With a palimpsest, some or all of the erased data may be recovered by sophisticated scientific techniques. It is well known that unless the format function is repeated several times, enough residual magnetization may remain on the disk from the data so that sophisticated electronic techniques can recover some or all of the data, as described, for example, in *Secure Deletion of Data from Magnetic and Solid-State Memory*, published by Peter Gutman of the Department of Computer Science at University of Aukland. Thus, complete erasure of data by formatting may not be fully effective. In addition, the formatting function is performed by scanning the read/write head along all the magnetic tracks on the magnetic data storage disk. The time required for these scans can be considerable, especially for large-capacity hard disk drives.

An industry has grown up providing degaussing services and degaussing equipment for erasing hard disk drives (HDD). The degaussing equipment is in the form of a device which generates a strong magnetic field and includes an enclosure into which a hard disk drive can be introduced for erasure. When activated, this device generates a magnetic field sufficiently strong to penetrate the chassis and/or housing of the hard disk drive and erase the disk in a time of a few minutes. While effective, the hard disk drive must be separated from the equipment in which it is normally housed and carried to the erasing device, which is likely to take excessive time in an emergency situation or on a vehicle subject to an attack. The size of the degaussing apparatus is relatively large, and the field strength required is such that a large power supply is used. Thus, a permanent installation is desirable for such equipment. In addition, erasure by this apparatus may render the hard disk drive unusable, which may be disadvantageous for situations in which emergencies may appear to be imminent but do not actually materialize.

Improved data erasing or erasure arrangements are desired.

SUMMARY OF THE INVENTION

An apparatus according to an aspect of the invention is for storing data. The apparatus comprises a magnetic data storage disk, and means for rotating the data storage disk. A read/write apparatus is provided for writing data to the data storage disk and for reading data from the data storage disk. A quasi-hermetically-sealed housing, which may be substantially metallic, completely encloses at least the data storage disk and the read/write apparatus. It may also enclose the means for rotating the data storage disk. Within the housing, an electromagnetic erasing or erasure means is provided which is independent of the read/write apparatus. The erasing means is magnetically coupled to at least a portion of the data storage disk for, when energized, generating a magnetic field for erasing the data on that portion of the data storage disk to which the erasing means is magnetically coupled. A chassis may support the housing as well as controls for the means for rotating and for the read/write apparatus. The chassis may also support a backup power supply for providing power to the erasing means.

In a particularly advantageous embodiment of the invention, the erasing means comprises an erasing disk lying generally parallel with a surface of said data storage disk and spaced away from the surface of the data storage disk by a space sufficient to accommodate the read/write apparatus.

In another advantageous embodiment of the invention, the erasing means comprises a magnetically or electromagnetically active erasure arm lying adjacent to, and radially disposed relative to, a surface of the data storage disk to be erased, for erasing that portion of the surface of the data storage disk lying under the erasing means.

An apparatus for storing data according to another aspect of the invention comprises a plurality of hard disk drives. Each of the hard disk drives includes
   (a) a magnetic data storage disk,
   (b) means for rotating the data storage disk,
   (c) a read/write apparatus for writing data to the data storage disk and for reading data from the data storage disk,
   (d) a housing which is at least quasi-hermetic, the housing completely enclosing at least the data storage disk and the read/write apparatus, and may also enclose the means for rotating, (e) electromagnetic erasing means independent of the read/write apparatus, the erasing means being located within the housing and magnetically coupled to the data storage disk for, when energized, erasing the data on that portion of the data storage disk to which the erasing means is coupled, (f) a network receiver for receiving signals, and for responding to network erasure command signals by energizing the electromagnetic erasing means.

The apparatus for storing data further comprises a network command arrangement for selectively generating network command signals, and a data network interconnecting the network command arrangement with the network receiver of each of the hard disk drives of the data storage apparatus. As a result, network erasure commands generated by the network command apparatus are applied to each of the hard disk drives for erasing the data storage magnetic disks of each of the hard disk drives.

BRIEF DESCRIPTION OF THE DRAWINGS

FIG. 1a is a simplified diagram illustrating a data storage drive including a magnetic data storage disk and an erasing disk located near each other within a quasi-hermetic housing within a hard disk drive, with an erase power control and a backup power supply.

FIG. 3a is a simplified block diagram illustrating some details of a manual control for the erasing arrangement, and FIG. 3b illustrates a generalized network-accessible relay control;

FIG. 4 is a simplified elevation representation of a data storage magnetic disk with data read/write arrangement and a radially scannable erasure arm; and FIG. 5 is a simplified block diagram illustrating a network arrangement including a source of erasure commands, in which erasure can be simultaneously commanded of all data storage disks coupled to the network.

DESCRIPTION OF THE INVENTION

Figure 1B:
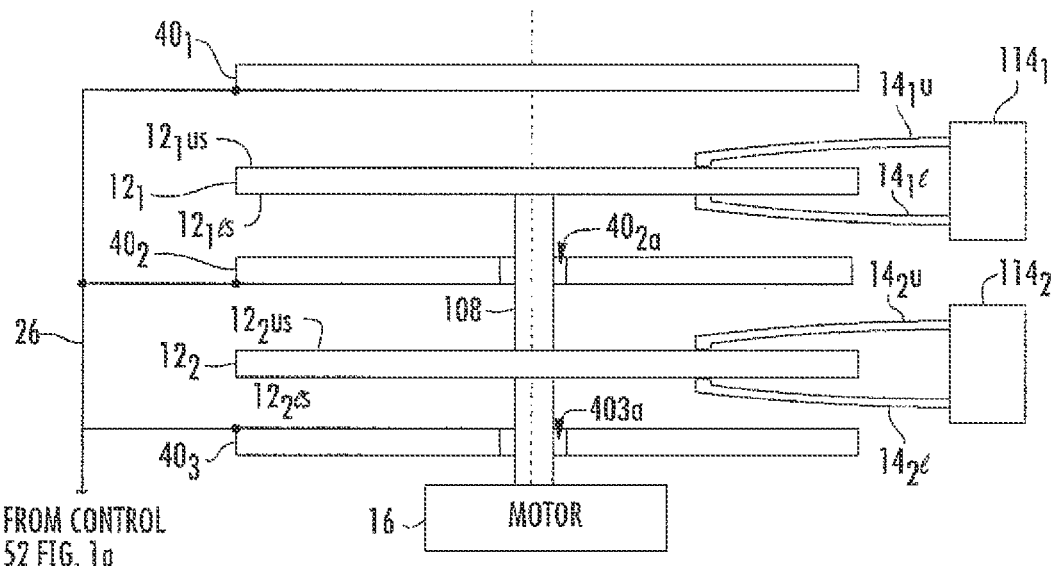
FIG. 1b is a simplified elevation cross-section of a multidisk arrangement similar to that of FIG. 1a, showing one way that the erasing arrangements can be placed.

FIG. 1a is a simplified diagram of salient parts of a hard disk drive 10. Hard disk drive 10 includes a magnetic data storage disk 12 and a controllable motor 16 for driving the magnetic data storage disk 12 about a "vertical" axis 8. Data is written to and read from the magnetic data storage disk 12 by means of one or more magnetic heads 14h affixed to a controllable articulating arm 14, which is capable of controllably scanning the head(s) 14h on a path across the upper surface 12us of the magnetic data storage disk 12. In conjunction with rotational motion of the magnetic data storage disk 12, the head(s) 14h can access most of the usable data storage area of surface 12us. As illustrated in FIG. 1a, the magnetic data storage disk 12, the arm 14, and head(s) 14h lie within a dust-free or quasi-hermetically-sealed housing illustrated by a dash line 20. It should be noted that the hermetic seal may intentionally not be perfect, as one or more highly filtered vent holes (not illustrated) may be provided to aid in equalizing pressure between the interior and exterior. Since the hermetic seal is not perfect, the housing 20 is referred to as being a quasi-hermetic-sealed housing. Housing 20 is intended to prevent entry of moisture or dust, which might compromise the reliability of the combination. Motor 16 may optionally lie within or without the housing 20.

The description herein may include relative placement or orientation words such as "top," "bottom," "up," "down," "lower," "upper," "horizontal," "vertical," "above," "below," as well as derivative terms such as "horizontally," "downwardly," and the like. These and other terms should be understood as to refer to the orientation or position then being described, or illustrated in the drawing(s), and not to the orientation or position of the actual element(s) being described or illustrated. These terms are used for convenience in description and understanding, and do not require that the apparatus be constructed or operated in the described position or orientation.

Terms concerning mechanical attachments, couplings, and the like, such as "connected," "attached," "mounted," refer to relationships in which structures are secured or attached to one another either directly or indirectly through intervening structures, as well as both movable and rigid attachments or relationships, unless expressly described otherwise.

Electrical connections are made to the magnetic head(s) 14h and to the controls or drives which move the articulated arm 14 of FIG. 1a. These electrical connections are designated 22. Electrical connections, illustrated as 24, must also be made to the drive motor 16. Electrical connections between the interior of the housing 20 and the external world are made, as known, by way of hermetic or other seals which allow the electrical conductors to penetrate the walls of the housing 20 without allowing entry of dust. In FIG. 1a, electrical connections 22 pass through the housing 20 wall at a hermetic seal 22h, and electrical connections 24 pass through the housing 20 wall at a hermetic seal 24h. Various control elements are located within the enclosure or chassis 11 which supports the various portions of the hard disk drive 10. These control elements include read/write arm controls and data transfer, illustrated as a block 30, and disk drive motor controls, illustrated as a block 32. Blocks 30 and 32 receive power by way of a conductor arrangement illustrated as a conductor 33. It should be noted that enclosure or chassis 11 need not be hermetically sealed, so conductors can enter or leave the enclosure or chassis 11 without hermetic seals.

According to an aspect of the invention, an erasing arrangement or means in the form of an erasing disk 40 is juxtaposed with or located adjacent to the "upper" surface 12us of the magnetic data storage disk 12, spaced therefrom by only so much space as is required for the operation of the read/write arm 14. Erasing disk 40 is located within quasi-hermetic housing 20. In one embodiment, erasing disk 40 includes one or more magnetic coils or electromagnets, which are controllably energized by electrical energy applied over a conductor 26, which passes through the wall of quasi-hermetic housing 20 at a hermetic seal 26h. A backup power supply 50 is powered from power conductor 33, and retains power for a time after power on conductor 33 is lost. A control illustrated as a block 52 selectively applies power from backup power supply 50 to erasing disk 40. Control 52 may be as simple as a pushbutton which makes electrical connection between the erasing disk 40 and backup power supply 50.

In another embodiment of the invention, the data storage disk 12 of FIG. 1a is made from a material which is sensitive to heat. In this embodiment, erasing disk 40 instead of generating magnetic fields, comprises a heater which is activated by control 52 and receives electrical power from the main power supply or from backup power supply 50. The heat generated by erasing disk 40 in this case destroys the sensitive surface $12us$ of the data storage disk and the data thereon.

In the context of a hard disk drive such as 10 of FIG. 1a located inside a computer chassis (not illustrated), access to a pushbutton such as 354 might require some disassembly, or at least operation of latches and the like. Such disassembly might be difficult to accomplish in an emergency situation. Even if access to a pushbutton were sufficiently easy for an emergency situation, there may be many instances in which many hard drives such as 10 will need to be erased or destroyed more-or-less simultaneously. In such a situation, control 52 of FIG. 1a would not be a pushbutton, but instead a relay or solid-state equivalent thereof, controlled (together with other such relays on other hard drives) by commands applied over an erase command data bus line 28. In such a context, a common erase command could be generated at a monitoring site, and sent in parallel or in common to the command lines 28 of all the hard disk drives 10 to be erased. It is understood that the command can be sent over a network interface from or to some central command computer.

FIG. 1b is a simplified side elevation diagram illustrating a plurality of magnetic data storage disks $12_1$ and $12_2$, together with erasing disks $40_1$, $40_2$ and $40_3$, showing how simultaneous erasure of multiple stacked disks can be accomplished. In FIG. 1b, two coaxially mounted magnetic data storage disks $12_1$ and $12_2$ are mounted for being driven about an axis 8 by a shaft or spindle 108 driven by a motor 16. Magnetic data storage disks $12_1$ and $12_2$ have upper and lower magnetic storage surfaces $12_1us$, $12_1ls$ and $12_2us$, $12_2ls$, respectively. The data stored on the various surfaces $12_1us$, $12_1ls$ and $12_2us$, $12_2ls$ are written and read by magnetic heads associated with arms $14_1u$, $14_1l$, $14_2u$, and $14_2l$. The arm sets $14_1u$, $14_1l$ as illustrated in FIG. 1b are driven by linear motor or other actuators $114_1$, and the arm sets $14_2u$, and $14_2l$ are independently driven by linear motor or other actuators $114_2$. In the arrangement of FIG. 1b, a first fixed (non-rotating) erasing disk $40_1$ is coaxially mounted above the upper surface $12_1us$ of data storage magnetic disk $12_1$. A similar erasing disk $40_2$ is fixed in position at a location lying between data storage magnetic disks $12_1$ and $12_2$. Erasing disk $40_2$ has a central aperture $40_2a$ through which the rotating shaft 108 can pass. A third erasing disk $40_3$ with a shaft 108 clearance aperture 403a is fixed in position below the lower surface $12_2ls$ of data storage magnetic disk $40_3$. Erasing disks $40_1$, $40_2$, and $40_3$ are connected in parallel to conductor 26, and when energized by way of conductor 26 generate magnetic fields which erase at least the adjacent magnetic surfaces of the magnetic disks $12_1$ and $12_2$.

While three erasing disks $40_1$, $40_2$, and $40_3$ are illustrated in FIG. 1b, it may not be necessary to provide an erasing disk adjacent each magnetically active side of a data storage magnetic disk. If the magnetic field produced by the erasing disk is sufficiently strong, only one or two erasing disks may be needed for a stack of plural data storage magnetic disks, especially if the data storage magnetic disks are made from glass, aluminum, or other nonmagnetic or paramagnetic material. Such materials allow the magnetic field produced on one side of a data storage magnetic disk to pass through the disk to act on other disks.

An advantage of using erasing disks for erasing the data on a data storage magnetic disk is that the data storage magnetic disk need not be rotating in order for the erasure to take place. This may be advantageous if the equipment is off (nonenergized) at the time that erasure is desired, with the erasing disk being energized by a separate backup power supply. This makes operation of the erasing disk independent of the rotation of the disk being erased. Also, this arrangement does not require any moving parts in erasure mechanism.

Figure 1C:
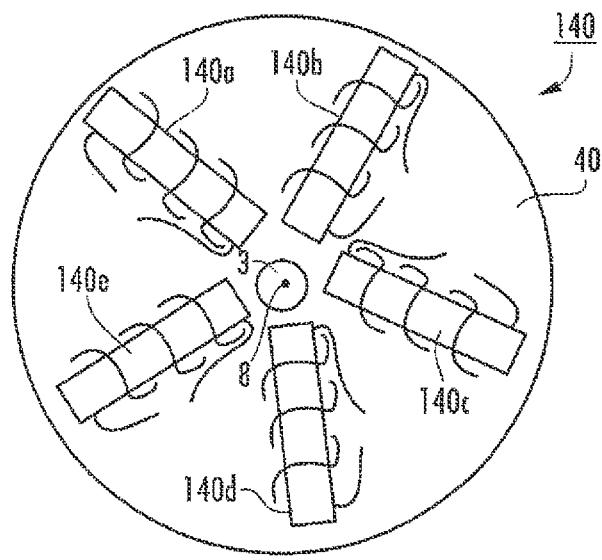
FIG. 1c is a notional representation of the distribution and arrangement of solenoidal magnetic field generators associated with an erasing disk.

FIG. 1c is a simplified elevation view illustrating details of the magnetic arrangements of a representative erasing disk. In FIG. 1c, the erasing disk is designated 40, and spindle clearance aperture is 3. A set 140 including a plurality of solenoidal magnetic coils is mounted on or in the disk 40. As illustrated, set 140 includes five coils 140a, 140b, 140c, 140d, and 140e The longitudinal or magnetic axes of the coils of set 140 are radially disposed relative to axis 8. The various magnetic coils may be connected in parallel, in series, or in series-parallel, all as generally known in the art. When the erasing arrangement is thermal, the coils of FIG. 1c may be replaced by resistors for generating heat in response to electrical current flow.

Figure 2:
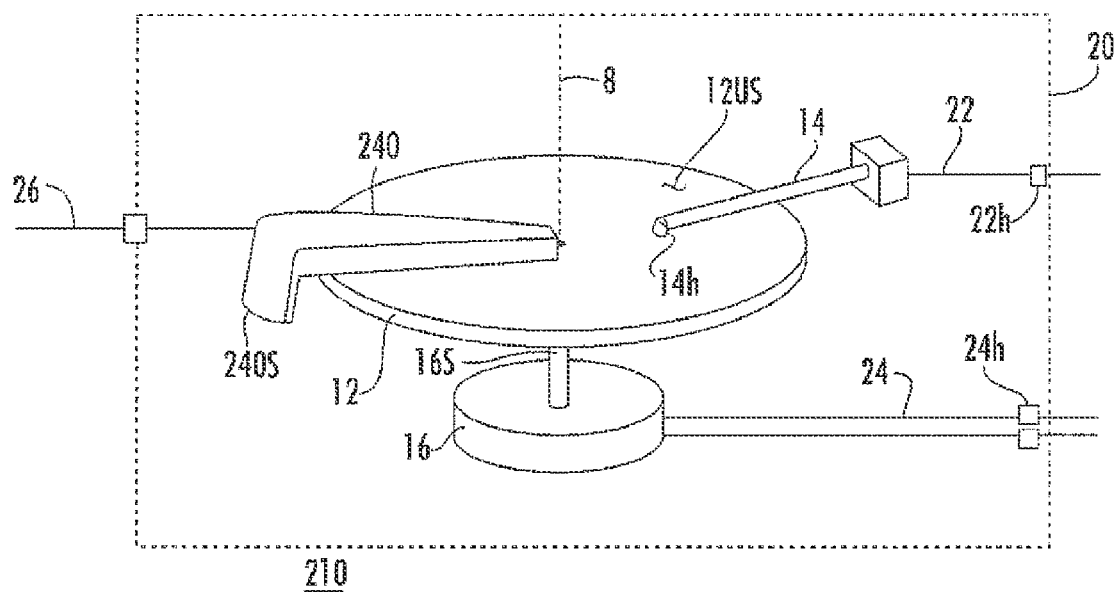
FIG. 2 is a simplified diagram illustrating a portion of a hard disk drive including the quasi-hermetic portion, with an erasing arrangement in the form of a bar extending radially relative to the data storage magnetic disk.

While one or more erasing disks such as those described in conjunction with FIGS. 1a, 1b, and 1c are advantageous, a simpler erasure structure can be used if the rotation of the data storage magnetic disk is taken advantage of. The arrangement of FIG. 2 illustrates a portion of another hard disk drive 210 according to an aspect of the invention. As illustrated in FIG. 2, a single data storage magnetic disk or platter 12 is arranged with read/write heads 14h on a movable arm 14, with data coupling and position control being provided by way of a bus 22. Motor 16 drives platter 12 by way of a spindle 16s, and is connected by bus 24 to the remainder (not illustrated) of hard disk drive 210. The arrangement of FIG. 2 provides for erasure by means of a fixed erasure segment, bar or arm 240, which may be viewed as being a segment of the erasing disk 40 of FIG. 1, having either magnetic or thermal erasure characteristics. Since the erasure bar 240 will tend to preferentially erase those portions of the platter 12 lying directly thereunder, it is desirable to have the platter rotating during erasure. Consequently, erasure may take slightly longer than with the erasing disk of FIGS. 1a, 1b, and 1c. Alternatively, the bar 240 may be energized to produce a magnetic field sufficiently strong so that even portions of the platter at locations remote from the bar are erased.

As an alternative to the fixed erasure segment, bar or arm 240 of FIG. 2, the erasure arm 240 may be arranged for rotation about axis 8, so that erasure of the magnetic surface of the platter 12 occurs over the duration of each rotation. FIG. 4 illustrates a further alternative, in which the erasure bar 440 may be arranged for controllable movement over the magnetically active surface $12us$ of the data storage magnetic disk 12. In FIG. 4, data read and write are provided by an arm 14 driven by a head controller 15. Similarly, erasure is provided by an arm 440 which is controlled 441 to scan one or more electromagnetic coils 442 approximately radially across the surface 12s of disk 12. The coil or coils 442 are energized by applying electrical energy to conductors 444.

The power supply 50 of FIG. 1a may use a battery or a supercapacitor allowing the erasure device to be activated at any time, even if the main power applied by way of bus 33 should not be available.

FIG. 3a is a simplified illustration of one form which control 52 can take. In FIG. 3a, control 52 is a simple mechanical switch 352 with a pushbutton illustrated as 354. Pressing pushbutton 354 sets the switch 352 to the ON state, coupling the power supply 50 (or the main power supply, if preferred) to conductor or bus 26 for energizing the erasure device. FIG. 3b illustrates a network-controlled selective relay for coupling the power supply 50 (or the main power supply) to the erasure device by way of conductor or bus 26 when a network command applied over bus 28 addresses the address-sensitive relay 362 and satisfies its fails-safe protocols.

The magnetic force required to erase a data storage magnetic disk is about five times the coercivity of the magnetic medium. Coercivity is measured in Oersteds (Oe), and is defined as the amount of magnetic field necessary to reduce the magnetic induction in the material to zero. For data storage magnetic disks the coercivity is in the range of 1,400 to 2,200 Oe. Thus, 7,000 to 11,000 Oe is required to demagnetize a data storage magnetic disk using static fields. One Oe corresponds to 80 amperes per meter (A/m). Assuming that the erasing disk or bar is maintained about 5 millimeters (mm) from the magnetic surface to be demagnetized, 1 Oe corresponds to 0.08 A/mm. Multiplying 7,000 Oe by 0.08 A/mm gives 560 amperes or approximately 500 amperes. This is for a static demagnetizing field. The required current can be substantially reduced by the use of alternating current. Also, the bringing the field to zero is not necessary to make the disk unusable.

FIG. 5 is a simplified diagram illustrating a network arrangement (500) in which a network path 528 interconnects a network command center 510 with a plurality, illustrated as two, of hard disk drives 10a and 10b. Computerized arrangement 510 includes a computer arrangement 512 which includes an operating system and programs, and which controls data flows through the network, including to and from the hard disk drives (HDD) 10a and 10b, and which has a keyboard user interface 514. In FIG. 5, each hard disk drive (HDD) 10a, 10b includes a network port 528, which is coupled to an addressable relay corresponding to addressable relay 362 of FIG. 3b, for coupling a power supply (not illustrated) to the data storage disk, as described in conjunction with FIGS. 1a, 1b, 1c, 2, or 4. In case of emergency warranting the erasure of all the data on the networked system, the operator may make appropriate keyboard entries to send the erasure command. Since the erasure command will not often be sent, it is possible that the keyboard sequence for erasure of all the data may be forgotten at the stressful moment that it is needed. In order to alleviate this problem, a pushbutton 354 is coupled to a simple memory arrangement 552 and to the computer arrangement 512 to apply to the computer arrangement 512 the erasure command sequence upon pushing of button 354. Thus, in an emergency, pushbutton 354 is depressed, which applies the "network erase" command to the computer arrangement 512, which in turn sends out the various network node addresses corresponding to the hard disk drives to be erased, together with the erase command itself. The erase command addressed to the various individual hard disk drives 10a, 10b are received thereby, decoded, and used to activate the erasing means of each HDD, thereby quickly accomplishing complete erasure.

Other embodiments of the invention will be apparent to those skilled in the art. For example, a magneto-optical data storage disk can be arranged with an erasing disk arranged in the described manner.

An apparatus (10) according to an aspect of the invention is for storing data. The apparatus comprises a magnetic data storage disk (12), and means (16) for rotating the data storage disk. A read/write apparatus (14, 14h) is provided for writing data to the data storage disk (12) and for reading data from the data storage disk (12). A quasi-hermetically-sealed, housing (20) completely encloses at least the data storage disk (12) and the read/write apparatus (14, 14h). It may also enclose the means (16) for rotating the data storage disk (12). The housing (20) may be substantially metallic. Within the housing (20), an electromagnetic erasing means (40, 240, 440) is provided which is independent of the read/write apparatus (14, 14h). The erasing means (40, 240, 440) is magnetically coupled to at least a portion (12us) of the data storage disk (12) for, when energized, generating a magnetic field for erasing the data on that portion of the data storage disk to which the erasing means (40, 240) is magnetically coupled. A chassis (11) supports the housing (20) as well as controls (30) for the read/write apparatus (14, 14h) and controls (32) for the means (16) for rotating. The chassis (11) may also support a backup power supply (50) for the erasing means (40, 240, 440) as well as manual (52) and or network (362) erasure controls.

In a particularly advantageous embodiment of the invention, the erasing means (40, 240) comprises an erasing disk (40) lying generally parallel with a surface (12us) of said data storage disk (12) and spaced away from the surface of the data storage disk by a space sufficient to accommodate the read/write apparatus (14, 14h).

In another advantageous embodiment of the invention, the erasing means comprises a magnetically or electromagnetically active erasure arm (240) lying adjacent to a surface of the data storage disk to be erased, and radially disposed relative to axis 8, for erasing that portion of the surface of the data storage disk lying under the erasing means.

An apparatus (500) for storing data according to an aspect of the invention comprises a plurality of hard disk drives (10a, 10b). Each of the hard disk drives (10a, 10b) includes
(a) a magnetic data storage disk (12),
(b) means (16) for rotating the data storage disk,
(c) a read/write apparatus (14, 14h) for writing data to the data storage disk (12) and for reading data from the data storage disk (12),
(d) a housing (20) which is at least quasi-hermetic, the housing (20) completely enclosing at least the data storage disk (12) and the read/write apparatus (14h, 14), and possibly the means (16) for rotating,
(e) electromagnetic erasing means (40, 240, 440) independent of the read/write apparatus (14h, 14), the erasing means (40, 240, 440) being located within the housing (20) and magnetically coupled to the data storage disk (12) for, when energized, erasing the data on that portion of the data storage disk (12) to which the erasing means (40) is coupled,
(f) a network receiver (362) for receiving signals, and for responding to network erasure command signals by energizing the electromagnetic erasing means (40).

The apparatus (500) for storing data further comprises a network command arrangement (510) for selectively generating network command signals; and
a data network (528) interconnecting the network command arrangement (510) with the network receiver (362) of each of the hard disk drives (10a, 10b) of the data storage apparatus (500), whereby network erasure commands generated by the network command apparatus (510) are applied to each of the hard disk drives (10a, 10b) for erasing the data storage magnetic disks (12) of each of the hard disk drives (10a, 10b).

The invention claimed is:

1. An apparatus for storing data comprising:
a chassis;
a data storage disk defining a central axis;
a read/write apparatus for writing data to the data storage disk and for reading data from the data storage disk;
a housing supported by said chassis, the housing enclosing the data storage disk and the read/write apparatus; and
an eraser independent of said read/write apparatus and located within the housing, the eraser comprising an erasing disk lying generally parallel with a surface of said data storage disk and continuously spaced away from said surface of said data storage disk by a space sufficient to accommodate said read/write apparatus, said eraser comprises a destructive heating element configured to heat at least a portion of the data storage disk to cause erasure of data on the data storage disk without overwriting the data or recording new data onto the data storage disk, wherein the destructive heating element comprises at least one resistor configured to generate heat sufficient to destroy a data-storing, heat-sensitive surface of the data storage disk.

2. The apparatus of claim 1, wherein the eraser is fixed with respect to the data storage disk.

3. The apparatus of claim 1, further comprising a first controller for controlling the operation of the read/write apparatus, and a second controller for independently controlling operation of the eraser.

4. The apparatus of claim 3, further comprising a backup power supply configured to supply power to the second controller and to the eraser independent of power supplied to the read/write apparatus.

5. The apparatus of claim 1, wherein the data storage disk comprises a magnetic data storage disk.

6. The apparatus of claim 1, further comprising a data bus for receiving signals, and for responding to received signals by energizing the eraser.

7. The apparatus of claim 1, further comprising a receiver for receiving signals from a network, and for responding to received network signals by energizing the eraser.

8. The apparatus of claim 1, wherein the housing is sealed with respect to the external environment.

9. A data storage device comprising:
a data storage disk defining a central axis;
a read/write apparatus for writing data to said data storage disk and for reading data from said data storage disk;
a housing enclosing at least said data storage disk and said read/write apparatus; and
an eraser independent of said read/write apparatus and located within said housing, the eraser comprising an erasing disk lying generally parallel with a surface of said data storage disk and continuously spaced away from said surface of said data storage disk by a space sufficient to accommodate said read/write apparatus, said eraser comprises a destructive heating element configured, when energized, to heat at least a portion of the data storage disk to cause erasure of data on said data storage disk without overwriting the data or recording new data onto the data storage disk, wherein the destructive heating element comprises at least one resistor configured to generate heat sufficient to destroy a data-storing, heat-sensitive surface of the data storage disk.

10. The device of claim 9, wherein the eraser is fixed with respect to the data storage disk.

11. The device of claim 9, further comprising a first controller for controlling the operation of the read/write apparatus, and a second controller for independently controlling operation of the eraser.

12. The device of claim 11, further comprising a backup power supply configured to supply power to the second controller and to the eraser independent of power supplied to the read/write apparatus.

13. The device of claim 9, wherein the data storage disk comprises a magnetic data storage disk.

14. The device of claim 9, further comprising a data bus for receiving signals, and for responding to received signals by energizing the eraser.

15. The device of claim 9, further comprising a receiver for receiving signals from a network, and for responding to received network signals by energizing the eraser.

16. The device of claim 9, wherein the housing is sealed with respect to the external environment.

\* \* \* \* \*

UNITED STATES PATENT AND TRADEMARK OFFICE
CERTIFICATE OF CORRECTION

| | | |
|---|---|---|
| PATENT NO. | : 8,369,045 B1 | Page 1 of 1 |
| APPLICATION NO. | : 13/537465 | |
| DATED | : February 5, 2013 | |
| INVENTOR(S) | : Vladimir Gershman, Ronald Dean and Bernard McGrath | |

It is certified that error appears in the above-identified patent and that said Letters Patent is hereby corrected as shown below:

Title page item (75), third inventor's last name should be spelled "McGrath".

Signed and Sealed this
Twenty-sixth Day of March, 2013

Teresa Stanek Rea
*Acting Director of the United States Patent and Trademark Office*